US009875140B2

(12) United States Patent
Chandramouli et al.

(10) Patent No.: US 9,875,140 B2
(45) Date of Patent: *Jan. 23, 2018

(54) SYSTEM, METHOD, AND APPARATUS FOR COORDINATING DISTRIBUTED ELECTRONIC DISCOVERY PROCESSING

(71) Applicant: ONE Discovery, Inc., Falls Church, VA (US)

(72) Inventors: Arvinth Chandramouli, Herndon, VA (US); Roger Ramia, Vienna, VA (US); Elias Francis, Vienna, VA (US); Anthony Soto, Springfield, VA (US); Hitesh Zinzuwadia, Clifton, VA (US)

(73) Assignee: ONE Discovery, Inc., Falls Church, VA (US)

( * ) Notice: Subject to any disclaimer, the term of this patent is extended or adjusted under 35 U.S.C. 154(b) by 77 days.

This patent is subject to a terminal disclaimer.

(21) Appl. No.: 15/142,784

(22) Filed: Apr. 29, 2016

(65) Prior Publication Data

US 2016/0321110 A1    Nov. 3, 2016

Related U.S. Application Data

(63) Continuation of application No. 14/638,451, filed on Mar. 4, 2015, now Pat. No. 9,354,936.

(60) Provisional application No. 61/948,275, filed on Mar. 5, 2014.

(51) Int. Cl.
*G06F 9/455*    (2006.01)
*G06F 9/50*    (2006.01)
*G06F 3/0484*    (2013.01)
*G06F 3/0482*    (2013.01)
(Continued)

(52) U.S. Cl.
CPC .......... *G06F 9/5038* (2013.01); *G06F 3/0482* (2013.01); *G06F 3/04842* (2013.01); *G06F 9/45533* (2013.01); *G06F 9/45558* (2013.01); *G06F 9/4881* (2013.01); *G06F 9/5077* (2013.01); *G06F 17/30097* (2013.01); *G06F 2009/4557* (2013.01); *G06F 2009/45583* (2013.01)

(58) Field of Classification Search
CPC .......................... G06F 9/4881; G06F 9/45533
USPC ....................................................... 718/1, 103
See application file for complete search history.

(56) References Cited

U.S. PATENT DOCUMENTS 6,112,225 A * 8/2000 Kraft ............... G06F 9/5066
                                                            709/201
7,162,473 B2   1/2007 Dumais et al.
7,523,130 B1   4/2009 Meadway et al.
(Continued)

*Primary Examiner* — Phillip H Nguyen
(74) *Attorney, Agent, or Firm* — The Webb Law Firm

(57) ABSTRACT

The present invention relates to a method, system, and apparatus for coordinating distributed electronic discovery processing. The method may comprise the steps of receiving electronic discovery data comprising a plurality of electronic files, determining, with at least one processor, a plurality of discrete tasks for processing the electronic discovery data, determining, with at least one processor, a coordinated distribution of the plurality of discrete tasks to a plurality of computers, and assigning at least a portion of the plurality of discrete tasks to the plurality of computers based on the coordinated distribution such that at least one discrete task is assigned to each computer at any given time or during any given time period. A system and apparatus configured to perform the method is also disclosed.

32 Claims, 9 Drawing Sheets

(51) Int. Cl.
G06F 9/48 (2006.01)
G06F 17/30 (2006.01)

(56) References Cited

U.S. PATENT DOCUMENTS

| | | | |
|---|---|---|---|
| 9,665,398 B2 * | 5/2017 | Magee | G06F 9/4881 |
| 2002/0186393 A1 | 12/2002 | Pochuev et al. | |
| 2008/0201383 A1 * | 8/2008 | Honigfort | G06F 17/30306 |
| 2009/0007101 A1 | 1/2009 | Azar et al. | |
| 2010/0186011 A1 | 7/2010 | Magenheimer | |
| 2011/0131448 A1 | 6/2011 | Vasil et al. | |
| 2012/0081743 A1 | 4/2012 | Watanabe et al. | |
| 2012/0185848 A1 * | 7/2012 | Devarakonda | G06F 9/45533 |
| | | | 718/1 |
| 2012/0254368 A1 | 10/2012 | Sasaki et al. | |
| 2014/0071482 A1 | 3/2014 | Ishibashi | |
| 2015/0124832 A1 * | 5/2015 | Ma | H04L 45/74 |
| | | | 370/412 |

* cited by examiner

SYSTEM, METHOD, AND APPARATUS FOR COORDINATING DISTRIBUTED ELECTRONIC DISCOVERY PROCESSING

CROSS REFERENCE TO RELATED APPLICATION

This application is a continuation of U.S. patent application Ser. No. 14/638,451, filed Mar. 4, 2015, which claims the benefit of priority from U.S. Provisional Patent Application No. 61/948,275, filed Mar. 5, 2014, both of which are incorporated herein by reference in their entirety.

BACKGROUND OF THE INVENTION

Field of the Invention

This invention relates generally to electronic document processing and, more specifically, a system, method, and apparatus for coordinating distributed electronic discovery processing across multiple machines.

Description of Related Art

Performing electronic discovery processing on large data sets is a processor and memory intensive exercise often exceeding the resources available on a single physical computer. Even the most advanced multi-core servers struggle to process data sets exceeding a few million documents in a timely manner.

Current electronic discovery processing software solutions focus on distributing the workload to multiple threads within a single instance of the running application. While this leverages all available resources granted to the application, the maximum processing power is constrained by the physical limitations of the host computer. Given the vast CPU and memory requirements needed to efficiently process so many documents, most electronic discovery processing systems typically reach bottlenecks when resource requirements exceed the available capabilities of the CPU and memory on the host computer. While these limitations may be acceptable for thousands or even millions of documents, they are not acceptable as the order of magnitude of data grows.

SUMMARY OF THE INVENTION

Accordingly, provided is a system, method, and apparatus for coordinating distributed electronic discovery processing that addresses the above-described limitations associated with existing electronic discovery processing systems and methods. Preferably, provided is a system, method, and apparatus for distributed electronic discovery processing that utilizes a coordinated and distributed approach to the electronic discovery process.

According to one preferred and non-limiting embodiment, provided is a computer-implemented method for coordinating distributed electronic discovery processing, comprising: receiving electronic discovery data for each of a plurality of discovery processing sessions, the electronic discovery data comprising a plurality of electronic files, wherein each session is associated with a priority; determining, with at least one processor, a plurality of discrete tasks for processing the electronic discovery data for each session of the plurality of discovery processing sessions; determining, with at least one processor, a coordinated distribution of the plurality of discrete tasks to a plurality of available worker machines based at least partially on the priority of each session of the plurality of discovery processing sessions, wherein the plurality of available worker machines comprise a plurality of virtual machines hosted by at least one physical host computer; assigning the plurality of discrete tasks to the plurality of available worker machines based on the coordinated distribution; and recording, in at least one database, processed data resulting from a performance of each discrete task by a worker machine.

According to another preferred and non-limiting embodiment, provided is a system for distributed electronic discovery processing, comprising: (a) at least one data storage device comprising electronic discovery data; (b) a plurality of worker machines, wherein each worker machine comprises at least one of a virtual machine and a physical computer programmed or configured to: (i) receive a discrete processing task to process data from the electronic discovery data; (ii) perform the discrete processing task, resulting in processed data; and (iii) record the processed data to at least one data storage device; (c) an electronic discovery distribution engine executing on at least one computer and in communication with the at least one data storage device and the plurality of worker machines, the electronic discovery distribution engine configured to: (i) determine a plurality of discrete processing tasks for processing the electronic discovery data; and (ii) automatically coordinate a distribution of the plurality of discrete processing tasks to available worker machines of the plurality of worker machines.

According to another preferred and non-limiting embodiment, provided is a computer program product for coordinating distributed electronic discovery processing for a plurality of discovery processing sessions, comprising at least one non-transitory computer-readable medium including program instructions that, when executed by at least one processor, cause the at least one processor to: receive electronic discovery data for each of a plurality of discovery processing sessions, the electronic discovery data comprising a plurality of electronic files, wherein each session is associated with a priority; determine a plurality of discrete tasks for processing the electronic discovery data for each session of the plurality of discovery processing sessions; determine a coordinated distribution of the plurality of discrete tasks to a plurality of available worker machines based at least partially on the priority of each session of the plurality of discovery processing sessions, wherein the plurality of available worker machines comprise a plurality of virtual machines hosted by at least one physical host computer; assign the plurality of discrete tasks to the plurality of worker machines based on the coordinated distribution; and record processed data resulting from a performance of each discrete task by a worker machine.

According to a further preferred and non-limiting embodiment, provided is a distributed electronic discovery processing engine comprising at least one non-transitory computer-readable medium, comprising: a loading module in communication with at least one data source comprising electronic discovery data, the loading module configured to start and/or stop electronic discovery processing; and a master module in communication with the loading module and a plurality of worker machines, the master module configured to distribute a plurality of tasks to the plurality of worker machines, wherein the plurality of tasks are generated by the loading module or master module based at least partially on user input.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 3C is a resource management user interface according to the principles of the present invention;

FIG. 3D is a resource monitor user interface according to the principles of the present invention;

DETAILED DESCRIPTION OF THE PREFERRED EMBODIMENTS

Figure 1:
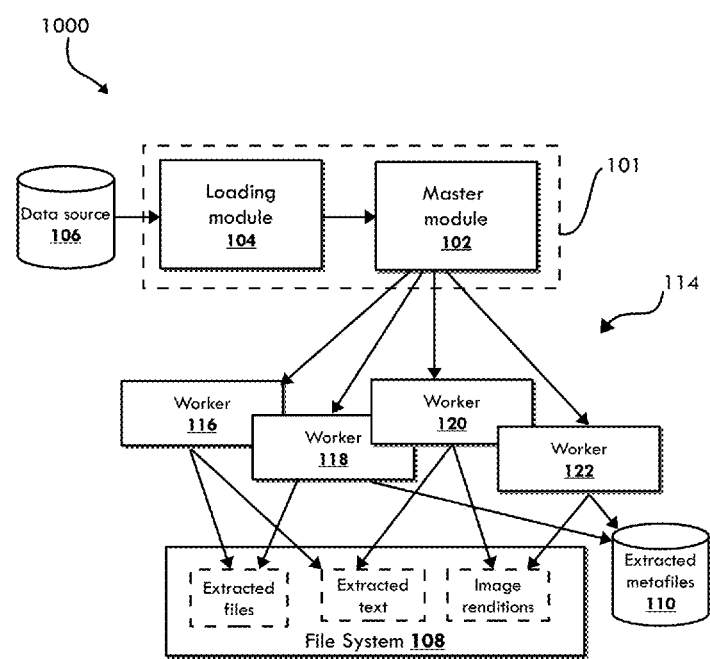
FIG. 1 is a schematic view of a system for coordinating distributed electronic discovery processing according to the principles of the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible.

According to a preferred and non-limiting embodiment of the present invention, a coordinated distributed electronic discovery processing system coordinates and distributes tasks among a plurality of worker machines. The tasks may include, for example, the extraction of files, metadata, and images from electronic discovery data, hard disk imaging, endorsing electronic discovery data, branding extracted data, and performing optical character recognition (OCR). The plurality of worker machines may include physical computers, virtual machines, and/or a combination of physical computers and virtual machines. A physical computer may include, for example, memory, one or more data storage units, one or more processors, and/or the like. A virtual machine may include, for example, one or more emulations of a physical computer executing on one or more physical computers or devices.

Referring now to FIG. 1, a coordinated distributed electronic discovery processing system 1000 is shown according to a preferred and non-limiting embodiment. A data source 106 includes electronic discovery data, such as one or more hard drive images, documents, compressed files, email archives, computer forensic data, raw data, and/or other like forms of electronic discovery. A host system 101 includes a loading module 104 and a master module 102. The loading module 104 provides one or more user interfaces configured to facilitate a user to select a data source 106, specify processing instructions and preferences, and start or stop processing sessions. The user interfaces may also allow a user to manage the priority of multiple concurrent sessions. The loading module 104, upon receiving a command to stop or start a processing session, transmits processing instructions to the master module 102. The loading module may include, for example, one or more software functions programmed to generate a user interface that allows a user to input parameters and/or select parameters from one or more selectable options, and interface with the data source 106. Selectable options may include one or more drop-down menus, radio buttons, check boxes, input fields, and/or other like graphical user interface elements for user interaction and input.

With continued reference to FIG. 1, the master module 102 distributes tasks across the available worker machines 114. The master module 102 may include one or more software functions programmed to analyze the data source 106 to determine how the data should be processed, although it will be appreciated that this processing task may also be performed by the loading module 104 or a different software component. The master module 102 then divides the necessary processing into discrete tasks. One or more discrete tasks are assigned to an available, idling worker machine 116, which performs the task(s), records the results 112 of the processing in the file system 108 and/or a separate database 110, and reports back to the master module 102 that it is once again available for new tasks.

In a preferred and non-limiting embodiment, only a single discrete task is assigned to the available, idling worker machine 116 and, in other embodiments, only a specified or configurable number of discrete tasks are assigned to the available, idling worker machine 116. The master module 102 may assign and/or unassign tasks to the worker machines 114, and may allocate worker machines 114 to various active sessions. It will be appreciated by those skilled in the art that the loading and master modules referred to are non-limiting embodiments of how the system 1000 may be implemented and that, in other embodiments, the software processes and functions for implementing the system 1000 may be arranged in various ways. For example, one or more software applications executing on one or more computers may perform the functions of the loading module 104 and master module 102.

As already described, the worker machines 114 may include physical computers and/or virtual machines on one or more networks. In a preferred and non-limiting embodiment, the worker machines 114 are arranged in a virtualized environment in which a plurality of physical host computers pool their respective processing resources to implement a plurality of virtual machines as the worker machines 114. With continued reference to FIG. 1, the worker machines 114 may communicate with the host system 101 directly or indirectly via a local area network (LAN) or wide-area network (WAN) connection, as examples. A task performed by one of the available worker machines 114 results in processed data, including but not limited to data that is extracted or converted such as files, textual data, image renditions, metadata, and/or the like. This resulting processed data may be recorded to a file system 108 and/or database 110.

In a preferred and non-limiting embodiment, the time-sensitivity of specific sessions or goals may influence how the tasks are distributed to the worker machines 114. As used herein, a "session" may refer to a set of tasks to be performed on a given data set to achieve one or more desired results (e.g., extraction, image processing, etc.). A user may specify a priority for a given session to influence the algorithm used to assign discrete tasks to available worker machines 114. For example, the priority of all pending sessions may be factored into what sessions are initially commenced as active sessions. The priority may be input by the user into a user interface through one or more selectable options. As an example, the priority may be specified based on categories (e.g., low priority, normal priority, high priority, etc.) or on a numeric value or some other selectable or configurable basis. The specified priorities for different sessions influence which sessions are started first. For example, all high priority sessions may be executed concurrently or substantially concurrently.

Further, in a preferred and non-limiting embodiment, a bias may be specified to further prioritize different sessions. The bias may be in the form of a percentage or other numeric value, or include further categories of priority. In this manner, the bias for a given session may serve as a sub-priority that influences the number of worker machines 114 assigned to that session with respect to other, concurrent sessions. For example, if three high-priority sessions are created, all three of those sessions may be processed concurrently. However, to determine the number of worker machines to be allocated to each session, the bias value may be used. A session with a higher bias value will be assigned more worker machines than a session with a lower bias value, even though both of those sessions are specified as high priority sessions. In a preferred and non-limiting embodiment, the bias value is specified by a user through a user interface generated by the loading module 104. However, it will be appreciated that the bias value may be specified in other ways such as, but not limited to, project completion dates, deadlines, and other variables that are available to the system 1000.

In non-limiting embodiments, one or more algorithms may be implemented to assign bias values to sessions based on a calculated urgency for that session. In a preferred and non-limiting embodiment, the bias value is a percentage and the allocation of worker machines is based on the percentage. For example, if a bias value for a first session is 100, and a bias value for another session is 50, the first session will take precedence and all available workers will be allocated to the first session and any other session also having a bias value of 100. If the first session has a bias value of 90, for example, and that is the highest bias of all sessions, 90% of the available worker machines will be allocated to that session and 10% of the available worker machines will be allocated to one or more sessions having the next highest bias value.

In a preferred and non-limiting embodiment, worker machines 114 can be added to the system 1000 at any time and be made available to running or new sessions, or removed at any time and be made available to unrelated processes. For example, additional worker machines 114 in the form of physical computers and/or virtual machines may be added to the network to contribute to the resource pool available to process the pending sessions. When new worker machines 114 are added, the worker allocation may be recalculated. If several new worker machines 114 are added, a majority of those worker machines 114 may initially be dedicated to performing tasks for the sessions having the highest bias value in the highest priority. The additional worker machines 114 may be allocated in proportion to the current allocation of worker machines 114 to running sessions or, in other examples, may be allocated to new sessions.

Figure 2A:
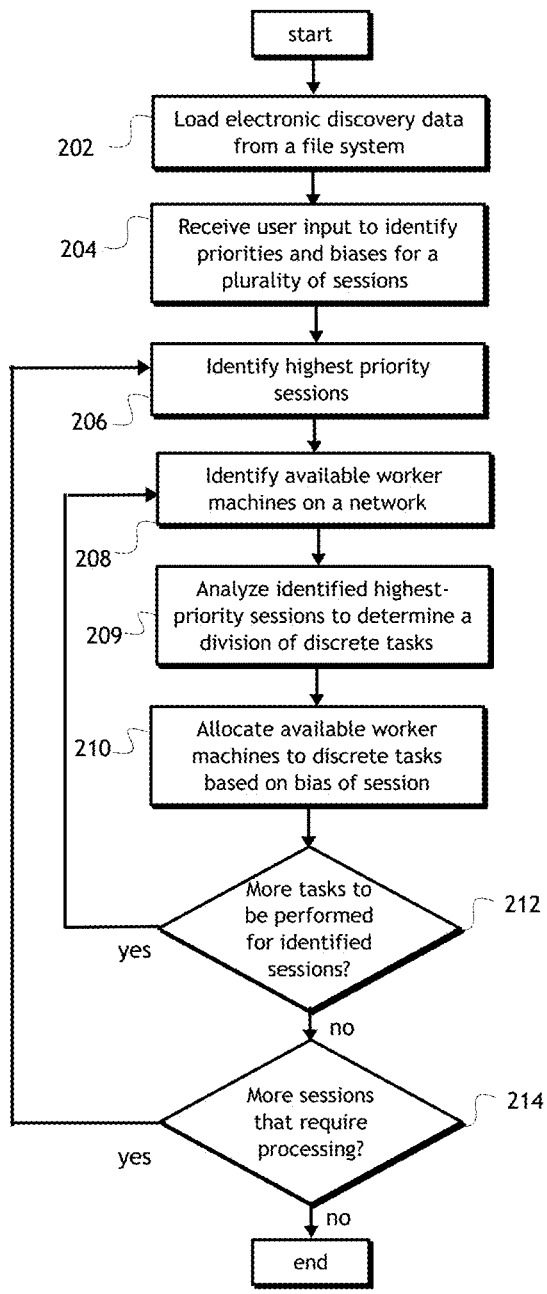
FIG. 2A is a step diagram for a method for coordinating distributed electronic discovery processing according to the principles of the present invention.

Referring now to FIG. 2A, a method for coordinating distributed electronic discovery processing is shown according to a preferred and non-limiting embodiment. Beginning with a first step 202, electronic discovery data is loaded from a file system. The location of the electronic discovery data, such as an identification of a file system and path name, may be specified by a user through a user interface. In some examples, user input may also specify the types of processing desired for a given data set, which in turn allows the system to identify separate processing sessions to take place. At a next step 204, additional user input is received to identify a priority and/or bias for each processing session.

With continued reference to FIG. 2A, at a next step 206 the system identifies the highest priority sessions. For example, if there are three processing sessions indicated to be high priority, and several normal priority or low priority processing sessions, the high priority sessions will be identified first. If there are no high priority sessions, the normal priority sessions will be identified first. It will be appreciated that various levels of priority may be used. Once the highest priority sessions are identified, the method proceeds to step 208 at which the available worker machines are identified. Available worker machines may be all worker machines on a given network that indicate availability. Availability may be determined by setting flags or other like binary indicators on the individual worker machines or, in other instances, maintaining a list or table of available worker machines that is modified when a task is assigned to a worker machine and when a worker machine reports that a task is complete. It will be appreciated that other methods of managing the statuses of the worker machines may be used.

Still referring to FIG. 2A, the method proceeds to step 209 at which the identified sessions of highest priority are analyzed to determine a division of discrete tasks for completing those sessions. Each session may be associated with a plurality of processing tasks to be performed on the electronic discovery data such as, for example, extracting data, recognizing characters, and other types of data processing. Next, at step 210, the available worker machines are allocated to the discrete tasks based on a bias of the identified sessions. For example, and as described herein, if three sessions are running concurrently and a plurality of worker machines are available, the plurality of worker machines will be allocated based on the bias of each session. The session with the highest bias will be allocated a greater number of worker machines than another session of equal priority having a lower bias. The worker machines allocated to each session are each assigned a discrete processing task and, after completing the task, each indicates that it is available for another task.

Referring again to FIG. 2A, at step 212 the system determines if there are more tasks to be performed for the sessions identified to be of the highest priority. If there are more tasks, the method proceeds back to step 208 and the available worker machines are again identified. Once there are no more tasks to be performed for the sessions identified to be of the highest priority, the method continues to step 214 at which it is determined whether there are more sessions that require processing. If there are additional sessions to be processed, the method proceeds back to step 206 to identify the highest priority sessions. For example, the next-highest priority sessions may be of a normal priority or a low priority. The method then continues as described above. At step 214, if there are no more sessions requiring processing, the method ends.

Figure 2B:
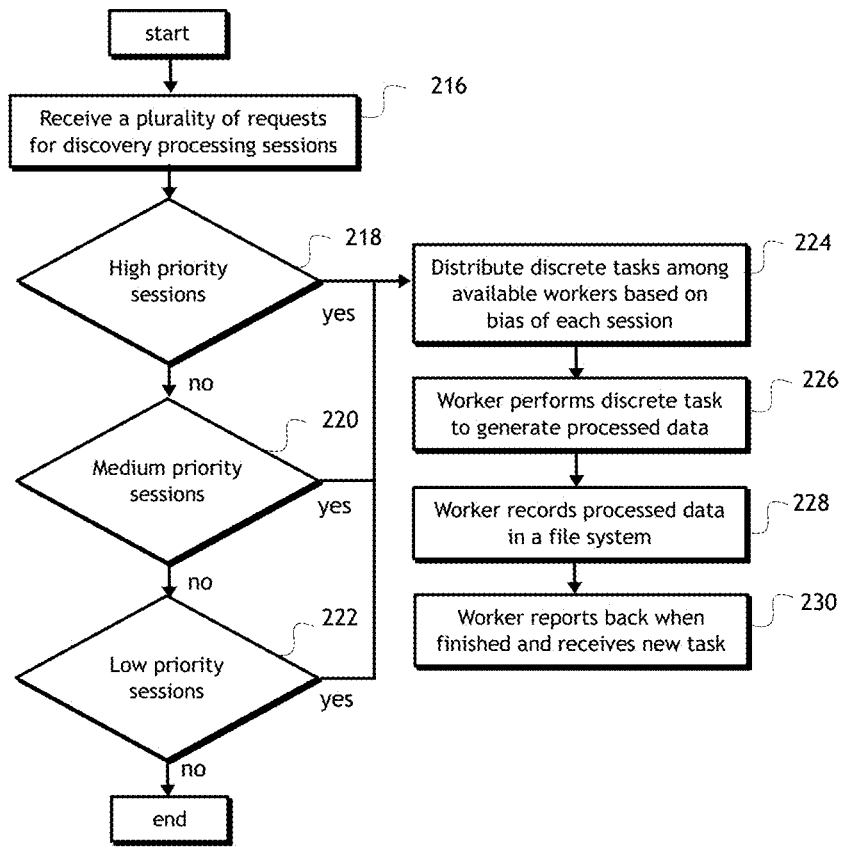
FIG. 2B is a step diagram for a method for coordinating distributed electronic discovery processing according to the principles of the present invention.

Referring now to FIG. 2B, a method for coordinating distributed electronic discovery processing is shown according to a preferred and non-limiting embodiment. At step 216, a plurality of requests are received for a plurality of data processing sessions. The requests may be received, for example, through one or more user interfaces that facilitate input and identification of data sources. At step 218, the high priority sessions, if any, are processed by continuing to steps 224-230. At step 224, the system distributes a plurality of discrete tasks among a number of available worker machines based on a bias, if any, of each session. Each worker machine then performs the discrete task assigned to it and generates processed data at step 226, records the processed data in a file system at step 228, and reports back to the system to receive a new task at step 230. At step 220, it is determined if any medium or normal priority sessions exist and, if so, steps 224-230 are performed again. Likewise, at step 222, it is determined if any low priority sessions exist and, if so, steps 224-230 are performed.

In a preferred and non-limiting embodiment, duplicate propagation may be used to save processing power and time (e.g., CPU cycles) that would otherwise be expended on tasks such as, for example, extracting text from a duplicate file that was already processed. For more efficient processing, a duplicate file is first detected through techniques such as, but not limited to, comparing hash values for the file to hash values for previously processed files. Those skilled in the art will appreciate that various forms and sequences of hashing may be used, and that different hash algorithms (e.g., SHA, MD5, etc.) may be used alone or in combination. Once a duplicate file is detected through this process, the system may propagate the duplicate file by creating a new record for the duplicate and storing, in the new record, a clone of the original file. This process eliminates the need to extract text and metadata from the duplicate file and thereby saves both storage space and processing power/time.

As an example, this duplicate propagation technique may be used in instances in which emails are produced for discovery that include duplicative file attachments. Such duplicates may be the result of forwarded emails or multiple custodians copied on an email. It will be appreciated that duplicate files may arise in various other situations as well. Further, in other embodiments, instead of cloning the original file and foregoing the processing steps, the duplicate file may be processed (e.g., extracting text and metadata), and a pointer to the original extracted text may be included in the metadata instead of storing duplicate data. However, unlike the duplicate propagation process described above that clones the original processed data, using a pointer still expends processing power and time.

Figure 3A:
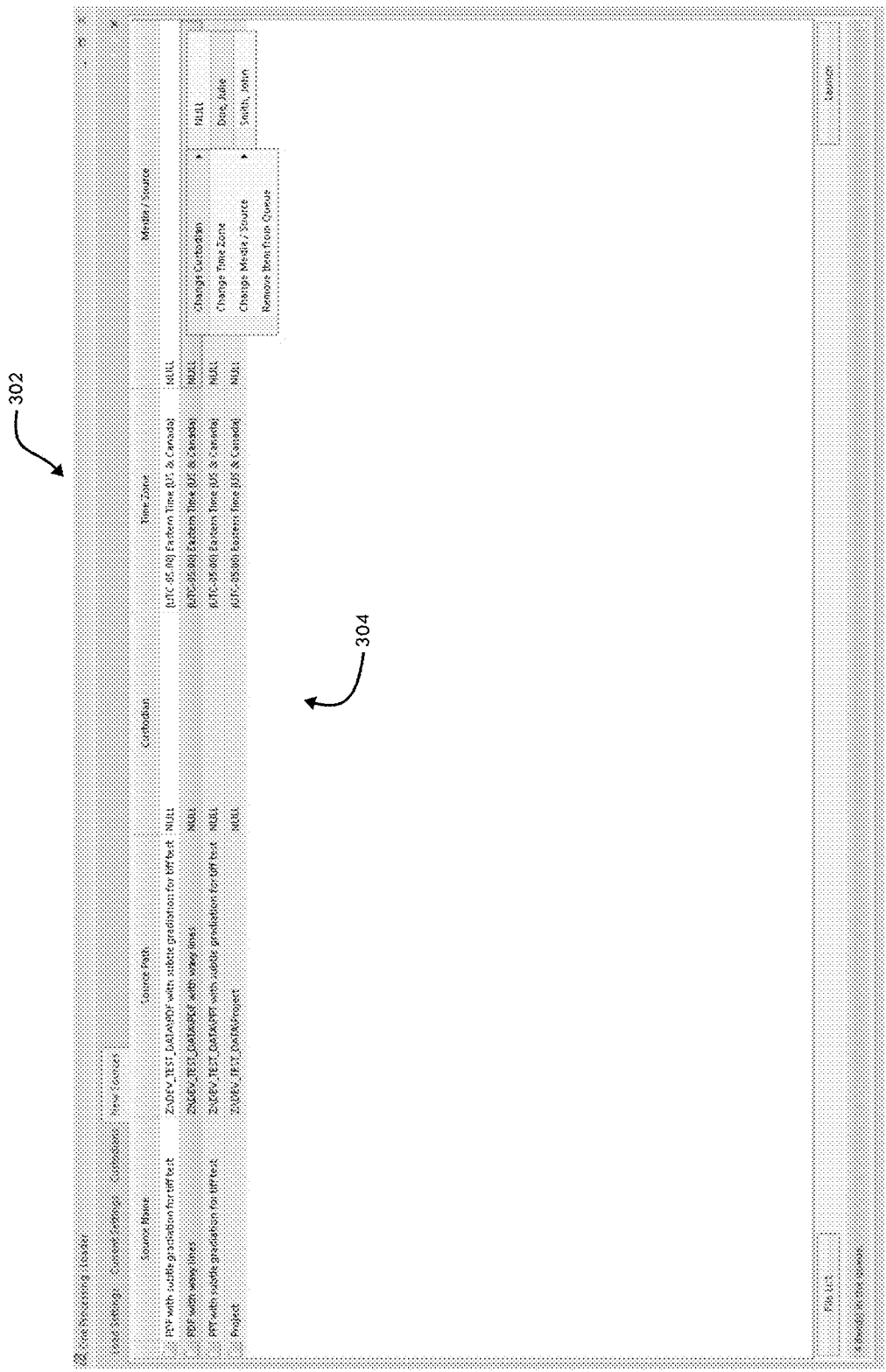
FIG. 3A is a data source user interface according to the principles of the present invention.

Referring now to FIG. 3A, a data source user interface 302 is shown according to a preferred and non-limiting embodiment. The user interface 302 shown in FIG. 3A lists the available data sources 304 and is configured to allow a user to select a particular data source. As depicted in FIG. 3A, each data source 304 has a name, a path, a custodian, a time zone, and a type of storage medium. Selectable options including, for example, file menus, drop-down menus, radio buttons, check boxes, text fields, tabs, and/or the like, may be provided to facilitate user input. In a preferred and non-limiting embodiment, the data source user interface 302 is generated by the loading module, although it will be appreciated that the user interface 302 may be generated by a variety of different software components.

Figure 3B:
FIG. 3B is a query building user interface according to the principles of the present invention.

Referring now to FIG. 3B, a query building user interface 306 is shown according to a preferred and non-limiting embodiment. In the depicted example, a session directed to extracting data from a data source has been completed and the query building interface 306 facilitates the filtering of results based on specified queries. A new session may then be created with a filtered subset of already-extracted data. Selectable options are presented on the query building interface 306 including a join operator option, a search type option, a field name option, an operator option, and a value option. Additional options may allow for a user to add a condition, insert a value, remove a value, or remove all values. Through these tools, a user can filter the processed data resulting from a processing session. In a preferred and non-limiting embodiment, the query building user interface 306 is generated by the loading module, although it will be appreciated that the interface may be generated by a variety of software components.

Figure 3C:
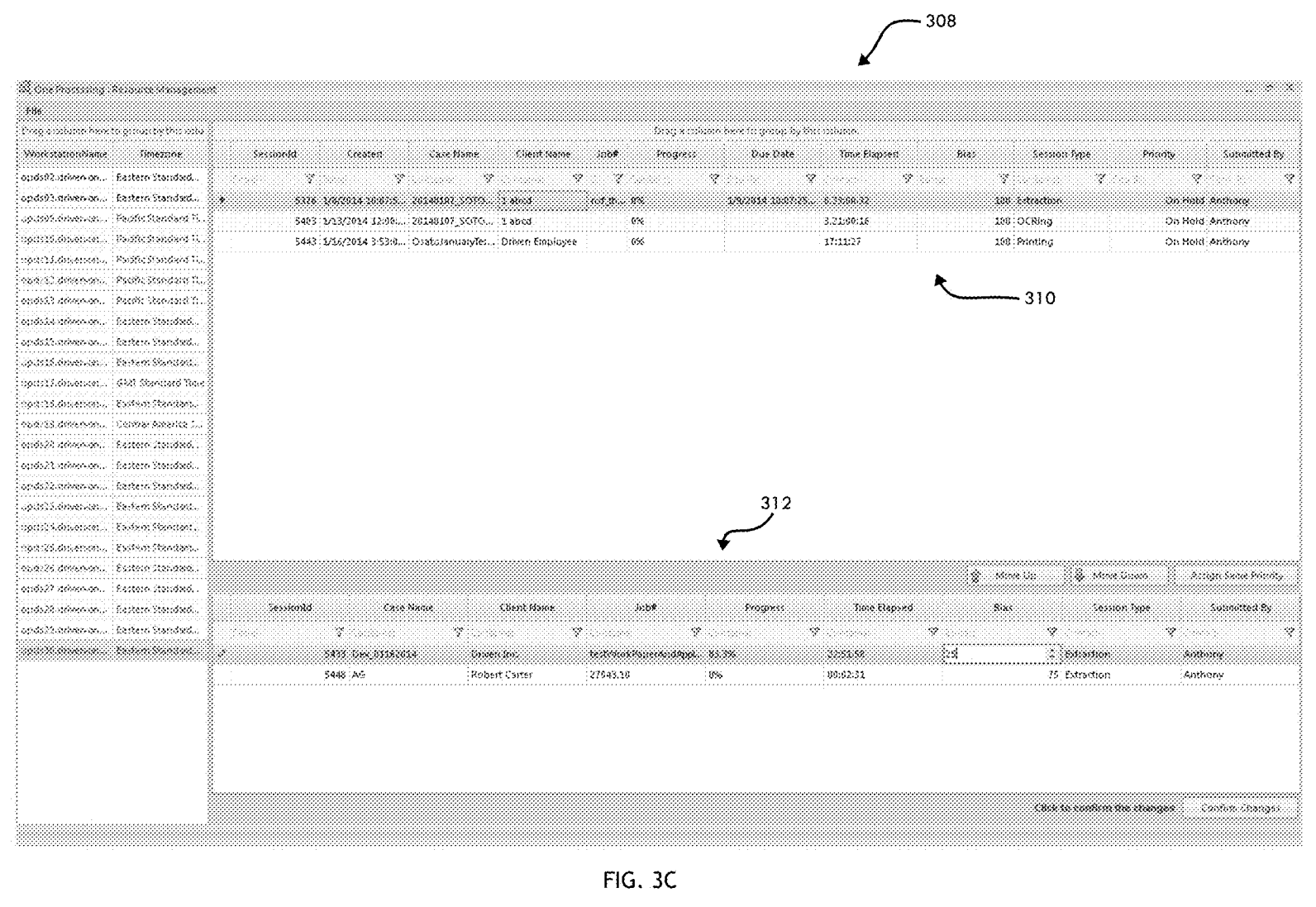

Referring now to FIG. 3C, a resource management user interface 308 is shown according to a preferred and non-limiting embodiment. The resource management interface 308 includes two lists of sessions 310, 312. The first list of sessions 310 includes active sessions that are currently underway or pending. The second list of sessions 312 includes sessions that have already been completed. Selectable options may be provided on the resource management user interface 308 to facilitate user input. For example, a user may input a priority, bias, and due date for each active session. As shown in FIG. 3C, the bias input field is selected for session "5433" and a bias of "25" has been entered.

Referring now to FIG. 3D, a resource monitor user interface 314 is shown according to a preferred and non-limiting embodiment. The resource monitor user interface 314 lists active sessions 316 and active worker machines 318. The list of active worker machines 318 lists, for each active worker machine, a session identifier, a source identifier, a session type (e.g., extracting, printing, OCR, etc.), a start time, and any other relevant details. As can be seen, the sessions "5448" and "5433" are active sessions. Session "5443" has only a single allocated worker machine and session "5448" has fourteen (14) allocated worker machines, indicating that session "5443" has a lower bias than session "5448." As in the resource management user interface 308, selectable options may be provided on the resource monitor user interface 314 to facilitate user input.

It will be appreciated that the user interfaces depicted in FIGS. 3A-3D may take on a variety of forms and, in some examples, be combined into one interface or split into multiple interfaces shown on one or more computers. The interfaces may also be generated by a software application or accessed over a network through a web browser and/or other like application.

Figure 3E:
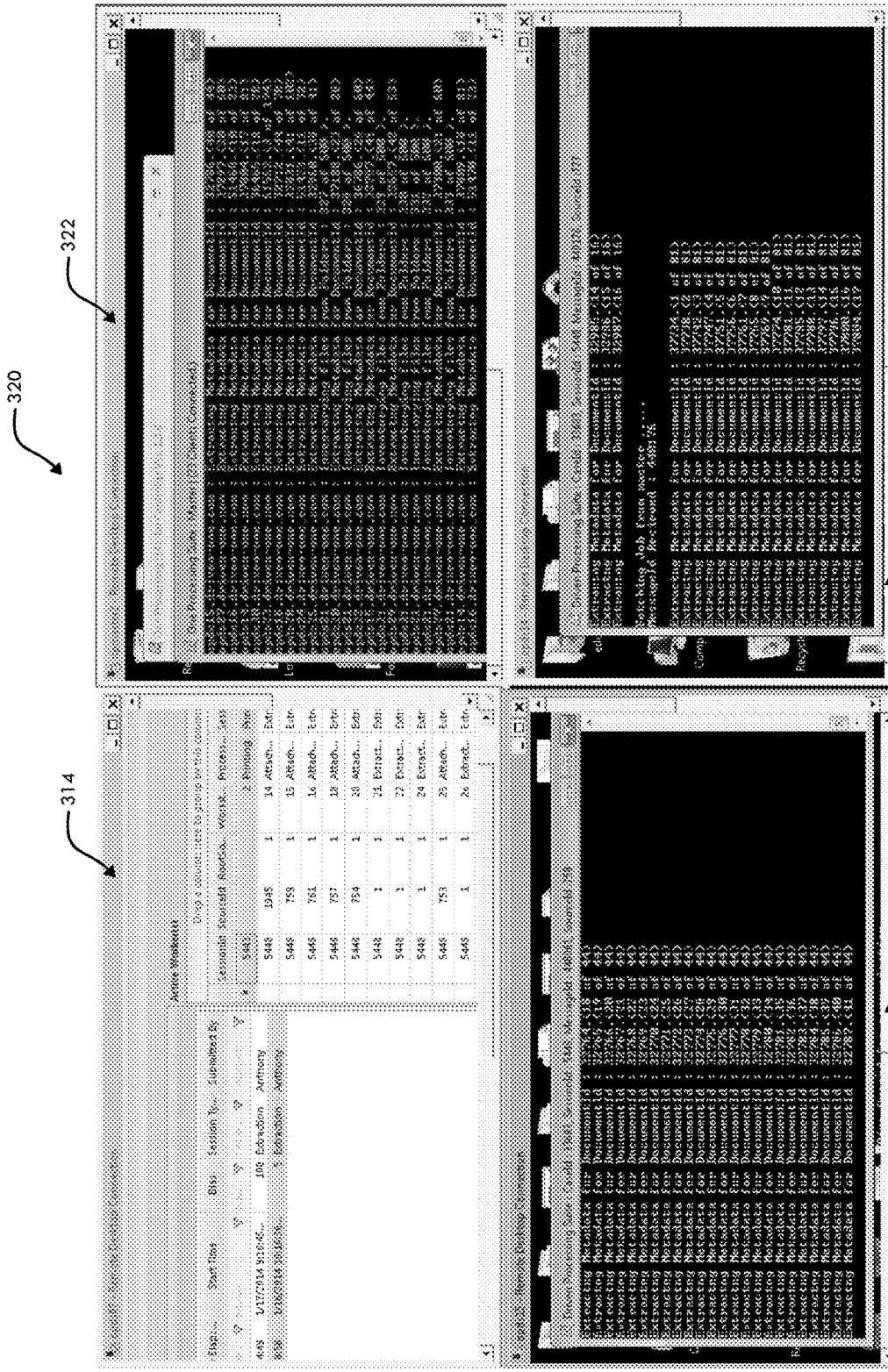
FIG. 3E is a working environment according to the principles of the present invention.

Referring now to FIG. 3E, a working environment 320 is shown according to a preferred and non-limiting embodiment. The working environment 320 includes a resource monitor user interface 314 and several remote desktop interfaces 322, 324, 326. Selecting a worker machine on the resource monitor interface 314 may initiate a remote desktop protocol (RDP) connection with a worker machine to allow for technical troubleshooting. The remote desktop interfaces 324, 326 show the current statuses of the corresponding worker machines, including the details of the data processing that the worker machine is performing. The remote desktop interface 322 shows details of a master module coordinating the distribution of tasks to the worker machines.

Figure 4:
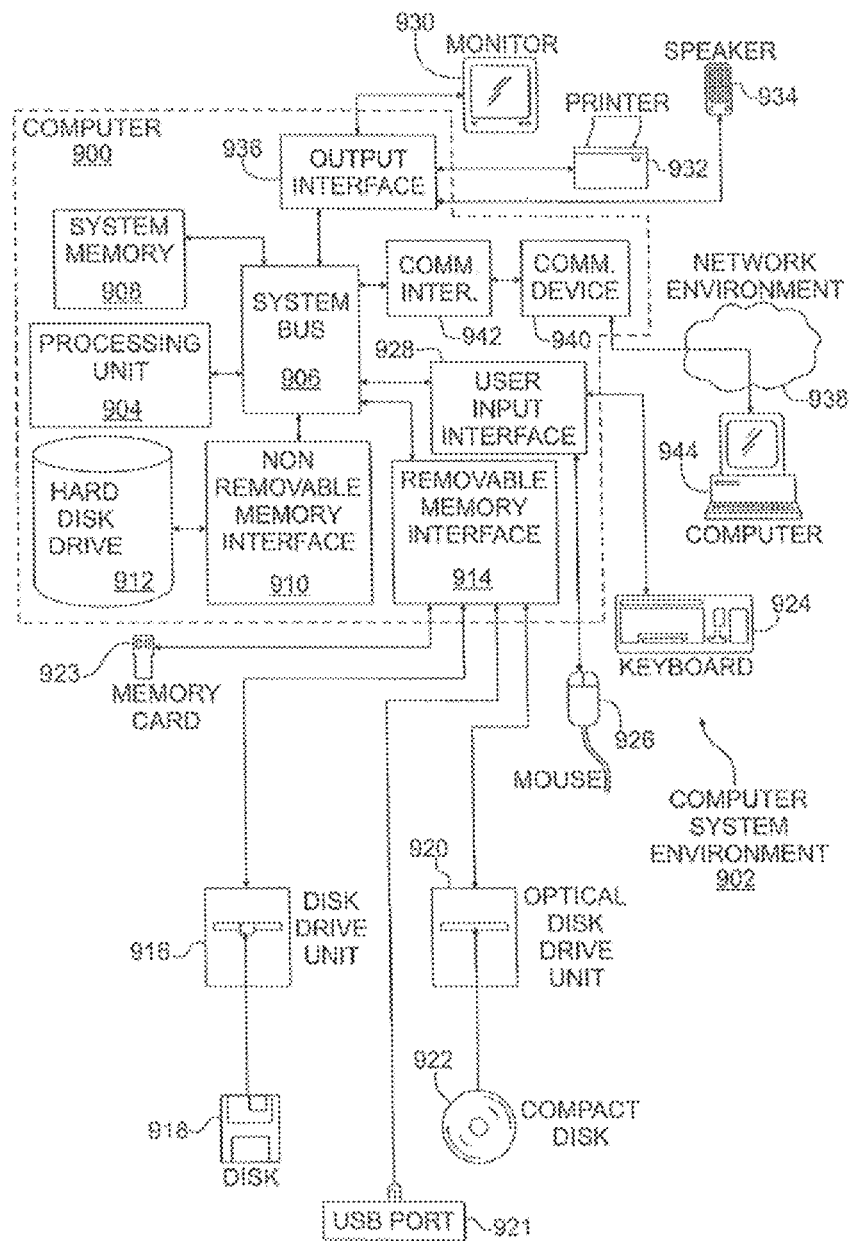
FIG. 4 is a schematic view of a computer and network infrastructure according to the prior art.

The present invention may be implemented on a variety of computing devices and systems, including the client devices and/or server computer, wherein these computing devices include the appropriate processing mechanisms and computer-readable media for storing and executing computer-readable instructions, such as programming instructions, code, and the like. As shown in FIG. 4, personal computers 900, 944, in a computing system environment 902 are provided. This computing system environment 902 may include, but is not limited to, at least one computer 900 having certain components for appropriate operation, execution of code, and creation and communication of data. For example, the computer 900 includes a processing unit 904 (typically referred to as a central processing unit or CPU) that serves to execute computer-based instructions received in the appropriate data form and format. Further, this processing unit 904 may be in the form of multiple processors executing code in series, in parallel, or in any other manner for appropriate implementation of the computer-based instructions.

In order to facilitate appropriate data communication and processing information between the various components of the computer 900, a system bus 906 is utilized. The system bus 906 may be any of several types of bus structures, including a memory bus or memory controller, a peripheral bus, or a local bus using any of a variety of bus architectures. In particular, the system bus 906 facilitates data and information communication between the various components (whether internal or external to the computer 900) through a variety of interfaces, as discussed hereinafter.

The computer 900 may include a variety of discrete computer-readable media components. For example, this computer-readable media may include any media that can be accessed by the computer 900, such as volatile media, non-volatile media, removable media, non-removable media, etc. As a further example, this computer-readable media may include computer storage media, such as media implemented in any method or technology for storage of information, such as computer-readable instructions, data structures, program modules, or other data, random access memory (RAM), read only memory (ROM), electrically erasable programmable read only memory (EEPROM), flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer 900. Further, this computer-readable media may include communications media, such as computer-readable instructions, data structures, program modules, or other data in other transport mechanisms and include any information delivery media, wired media (such as a wired network and a direct-wired connection), and wireless media. Computer-readable media may include all machine-readable media with the sole exception of transitory, propagating signals. Of course, combinations of any of the above should also be included within the scope of computer-readable media.

The computer 900 further includes a system memory 908 with computer storage media in the form of volatile and non-volatile memory, such as ROM and RAM. A basic input/output system (BIOS) with appropriate computer-based routines assists in transferring information between components within the computer 900 and is normally stored in ROM. The RAM portion of the system memory 908 typically contains data and program modules that are immediately accessible to or presently being operated on by processing unit 904, e.g., an operating system, application programming interfaces, application programs, program modules, program data and other instruction-based computer-readable codes.

With continued reference to FIG. 4, the computer 900 may also include other removable or non-removable, volatile or non-volatile computer storage media products. For example, the computer 900 may include a non-removable memory interface 910 that communicates with and controls a hard disk drive 912, i.e., a non-removable, non-volatile magnetic medium; and a removable, non-volatile memory interface 914 that communicates with and controls a magnetic disk drive unit 916 (which reads from and writes to a removable, non-volatile magnetic disk 918), an optical disk drive unit 920 (which reads from and writes to a removable, non-volatile optical disk 922, such as a CD ROM), a Universal Serial Bus (USB) port 921 for use in connection with a removable memory card, etc. However, it is envisioned that other removable or non-removable, volatile or non-volatile computer storage media can be used in the exemplary computing system environment 900, including, but not limited to, magnetic tape cassettes, DVDs, digital video tape, solid state RAM, solid state ROM, etc. These various removable or non-removable, volatile or non-volatile magnetic media are in communication with the processing unit 904 and other components of the computer 900 via the system bus 906. The drives and their associated computer storage media discussed above and illustrated in FIG. 4 provide storage of operating systems, computer-readable instructions, application programs, data structures, program modules, program data and other instruction-based computer-readable code for the computer 900 (whether duplicative or not of this information and data in the system memory 908).

A user may enter commands, information, and data into the computer 900 through certain attachable or operable input devices, such as a keyboard 924, a mouse 926, etc., via a user input interface 928. Of course, a variety of such input devices may be utilized, e.g., a microphone, a trackball, a joystick, a touchpad, a touch-screen, a scanner, etc., including any arrangement that facilitates the input of data, and information to the computer 900 from an outside source. As discussed, these and other input devices are often connected to the processing unit 904 through the user input interface 928 coupled to the system bus 906, but may be connected by other interface and bus structures, such as a parallel port, game port, or a universal serial bus (USB). Still further, data and information can be presented or provided to a user in an intelligible form or format through certain output devices, such as a monitor 930 (to visually display this information and data in electronic form), a printer 932 (to physically display this information and data in print form), a speaker 934 (to audibly present this information and data in audible form), etc. All of these devices are in communication with the computer 900 through an output interface 936 coupled to the system bus 906. It is envisioned that any such peripheral output devices be used to provide information and data to the user.

The computer 900 may operate in a network environment 938 through the use of a communications device 940, which is integral to the computer or remote therefrom. This communications device 940 is operable by and in communication to the other components of the computer 900 through a communications interface 942. Using such an arrangement, the computer 900 may connect with or otherwise communicate with one or more remote computers, such as a remote computer 944, which may be a personal computer, a server, a router, a network personal computer, a peer device, or other common network nodes, and typically includes many or all of the components described above in connection with the computer 900. Using appropriate communication devices 940, e.g., a modem, a network interface or adapter, etc., the computer 900 may operate within and communication through a local area network (LAN) and a wide area network (WAN), but may also include other networks such as a virtual private network (VPN), an office network, an enterprise network, an intranet, the Internet, etc. It will be appreciated that the network connections shown are exemplary and other means of establishing a communications link between the computers 900, 944 may be used.

As used herein, the computer 900 includes or is operable to execute appropriate custom-designed or conventional software to perform and implement the processing steps of the method and system of the present invention, thereby, forming a specialized and particular computing system. Accordingly, the presently-invented method and system may include one or more computers 900 or similar computing devices having a computer-readable storage medium capable of storing computer-readable program code or instructions that cause the processing unit 902 to execute, configure, or otherwise implement the methods, processes, and transformational data manipulations discussed hereinafter in connection with the present invention. Still further, the computer 900 may be in the form of a personal computer, a personal digital assistant, a portable computer, a laptop, a palmtop, a mobile device, a mobile telephone, a server, or any other type of computing device having the necessary processing hardware to appropriately process data to effectively implement the presently-invented computer-implemented method and system.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A computer-implemented method for coordinating distributed electronic discovery processing, comprising:
    receiving electronic discovery data for each of a plurality of discovery processing sessions, the electronic discovery data comprising a plurality of electronic files, wherein each session is associated with a priority;
    determining, with at least one processor, a plurality of discrete tasks for processing the electronic discovery data for each session of the plurality of discovery processing sessions;
    determining, with at least one processor, a coordinated distribution of the plurality of discrete tasks to a plurality of available worker machines based at least partially on the priority of each session of the plurality of discovery processing sessions, wherein the plurality of available worker machines comprise a plurality of virtual machines hosted by at least one physical host computer;
    assigning, with at least one processor, the plurality of discrete tasks to the plurality of available worker machines based on the coordinated distribution; and
    recording, with at least one processor in at least one database, processed data resulting from a performance of each discrete task by a worker machine.

2. The computer-implemented method of claim 1, wherein recording the processed data results an one original file, further comprising:
    detecting, with at least one processor, a duplicate file of the at least one original file in the electronic discovery data based at least partially on hash values of the duplicate file and the original file;
    generating, with at least one processor, a new record for the duplicate file;
    generating, with at least one processor, a clone of the original file; and
    storing the clone in the new record.

3. The computer-implemented method of claim 2, further comprising generating, with at least one processor, a hash value for each file processed of the plurality of electronic files, wherein the duplicate file is detected by comparing a hash value for the duplicate file with at least one hash value for at least one previously processed file including the original file, such that the hash value for the duplicate file matches at least one hash value for the original file.

4. The computer-implemented method of claim 1, wherein recording the processed data results in an original file, further comprising:
    detecting, with at least one processor, a duplicate file of the original file in the electronic discovery data;
    generating, with at least one processor, a new record for the duplicate file; and
    storing a pointer to the original file in the new record.

5. The computer-implemented method of claim 4, further comprising: processing the duplicate file, resulting in extracted data including metadata, wherein storing the pointer in the new record comprises embedding the pointer in the metadata.

6. The computer-implemented method of claim 1, further comprising:
    determining, with at least one processor, a bias for each session of the plurality of discovery sessions, wherein the bias is based at least partially on at least one deadline comprising at least one of the following: a project completion date, a determined deadline, an inputted deadline, or any combination thereof; and determining, with at least one processor, processing resource allocations for the plurality of discovery processing sessions, wherein the coordinated distribution is determined based at least partially on the determined processing resource allocations such that a session with a higher bias will be assigned more worker machines than a session with a lower bias having the same priority as the session with the higher bias.

7. The computer-implemented method of claim 1, wherein receiving the electronic discovery data comprises at least one of the following: loading the electronic discovery data from a file system, receiving the electronic discovery data over a network, identifying a location of the electronic discovery data, or any combination thereof.

8. The computer-implemented method of claim 1, further comprising:
   adding at least one worker machine to the plurality of available worker machines;
   determining, with at least one processor, a new coordinated distribution of at least a portion of the plurality of discrete tasks to the plurality of available worker machines; and
   assigning, with at least one processor, at least a portion of the plurality of discrete tasks to the plurality of available worker machines based on the new coordinated distribution.

9. The computer-implemented method of claim 8, wherein the new coordinated distribution comprises an allocation of worker machines to active sessions proportional to a current allocation of worker machines to active sessions.

10. The computer-implemented method of claim 1, further comprising:
    generating, with at least one processor, a resource monitor user interface comprising at least one selectable option configured to select a worker machine from the plurality of worker machines;
    receiving a user selection of a selected worker machine through the resource monitor user interface; and
    initiating a remote desktop connection with the selected worker machine in response to the user selection.

11. The computer-implemented method of claim 1, wherein only a single discrete task is assigned to an available worker machine at a time.

12. The computer-implemented method of claim 1, further comprising receiving, from at least one user, a priority and a bias for each discovery processing session of the plurality of discovery processing sessions, wherein determining the coordinated distribution of the plurality of discrete tasks to the plurality of available worker machines comprises:
    (a) identifying at least one discovery processing session of the plurality of discovery processing sessions having a highest priority;
    (b) identifying a subset of available worker machines of the plurality of available worker machines;
    (c) allocating the subset of available worker machines to the at least one discovery processing session having the highest priority based on the bias for each discovery processing session of the at least one discovery processing session; and
    (d) repeating steps (a)-(c) for remaining discovery processing sessions of the plurality of discovery processing sessions.

13. A computer program product for coordinating distributed electronic discovery processing for a plurality of discovery processing sessions, comprising at least one non-transitory computer-readable medium including program instructions that, when executed by at least one processor, cause the at least one processor to:
    receive electronic discovery data for each of a plurality of discovery processing sessions, the electronic discovery data comprising a plurality of electronic files, wherein each session is associated with a priority;
    determine a plurality of discrete tasks for processing the electronic discovery data for each session of the plurality of discovery processing sessions;
    determine a coordinated distribution of the plurality of discrete tasks to a plurality of available worker machines based at least partially on the priority of each session of the plurality of discovery processing sessions, wherein the plurality of available worker machines comprise a plurality of virtual machines hosted by at least one physical host computer;
    assign the plurality of discrete tasks to the plurality of worker machines based on the coordinated distribution; and
    record processed data resulting from a performance of each discrete task by a worker machine.

14. The computer program product of claim 13, wherein recording the processed data results in an original file, and wherein the program instructions, when executed by the at least one processor, further cause the at least one processor to:
    detect a duplicate file of the original file in the electronic discovery data based at least partially on hash values of the duplicate file and the original file;
    generate a new record for the duplicate file;
    generate a clone of the original file; and
    store the clone in the new record.

15. The computer program product of claim 14, wherein the program instructions, when executed by the at least one processor, further cause the at least one processor to generate a hash value for each file processed of the plurality of electronic files, wherein the duplicate file is detected by comparing a hash value for the duplicate file with at least one hash value for at least one previously processed file including the original file, such that the hash value for the duplicate file matches at least one hash value for the original file.

16. The computer program product of claim 13, wherein recording the processed data results in an original file, and wherein the program instructions, when executed by the at least one processor, further cause the at least one processor to:
    detect a duplicate file of the original file in the electronic discovery data;
    generate a new record for the duplicate file; and
    store a pointer to the original file in the new record.

17. The computer program product of claim 16, wherein the program instructions, when executed by the at least one processor, further cause the at least one processor to process the duplicate file, resulting in extracted data including metadata, and wherein storing the pointer in the new record comprises embedding the pointer in the metadata.

18. The computer program product of claim 13, wherein the program instructions, when executed by the at least one processor, further cause the at least one processor to:
    determine a bias for each session of the plurality of discovery sessions based at least partially on at least one deadline; and determine processing resource allocations for the plurality of discovery processing sessions, wherein the coordinated distribution is determined based at least partially on the determined processing resource allocations such that a session with a higher bias will be assigned more worker machines than a session with a lower bias having the same priority as the session with the higher bias.

19. The computer program product of claim 13, wherein the program instructions, when executed by the at least one processor, further cause the at least one processor to:
add at least one worker machine to the plurality of available worker machines;
determine a new coordinated distribution of at least a portion of the plurality of discrete tasks to the plurality of available worker machines; and
assign at least a portion of the plurality of discrete tasks to the plurality of available worker machines based on the new coordinated distribution.

20. The computer program product of claim 19, wherein the new coordinated distribution comprises an allocation of worker machines to active sessions proportional to a current allocation of worker machines to active sessions.

21. The computer program product of claim 13, wherein the program instructions, when executed by the at least one processor, further cause the at least one processor to:
generate a resource monitor user interface comprising at least one selectable option configured to select a worker machine from the plurality of worker machines;
receive a user selection of a selected worker machine through the resource monitor user interface; and
initiate a remote desktop connection with the selected worker machine in response to the user selection.

22. The computer program product of claim 13, wherein only a single discrete task is assigned to an available worker machine at a time.

23. The computer program product of claim 13, wherein the program instructions, when executed by the at least one processor, further cause the at least one processor to receive, from at least one user, a priority and a bias for each discovery processing sessions of the plurality of discovery processing sessions, wherein determining the coordinated distribution of the plurality of discrete tasks to the plurality of available worker machines comprises:
(a) identifying at least one discovery processing session of the plurality of discovery processing sessions having a highest priority;
(b) identifying a subset of available worker machines of the plurality of available worker machines;
(c) allocating the subset of available worker machines to the at least one discovery processing session having the highest priority based on the bias for each discovery processing session of the at least one discovery processing session; and
(d) repeating steps (a)-(c) for remaining discovery processing sessions of the plurality of discovery processing sessions.

24. A system for distributed electronic discovery processing, comprising:
(a) at least one data storage device comprising electronic discovery data;
(b) a plurality of worker machines, wherein each worker machine comprises at least one of a virtual machine and a physical computer programmed or configured to:
(i) receive a discrete processing task to process data from the electronic discovery data;
(ii) perform the discrete processing task, resulting in processed data; and
(iii) record the processed data to at least one data storage device;
(c) an electronic discovery distribution engine executing on at least one computer and in communication with the at least one data storage device and the plurality of worker machines, the electronic discovery distribution engine configured to:
(i) determine a plurality of discrete processing tasks for processing the electronic discovery data; and
(ii) automatically coordinate a distribution of the plurality of discrete processing tasks to available worker machines of the plurality of worker machines.

25. The system of claim 24, wherein the electronic discovery distribution engine comprises a loading module and a master module, wherein the loading module is programmed or configured to receive user input comprising at least one of the following: an identification of a data source for the electronic discovery data, an instruction to stop or start at least one discovery processing session of the plurality of discovery processing sessions, user preferences, or any combination thereof, and wherein the master module is programmed or configured to determine the plurality of discrete processing tasks for processing the electronic discovery data and automatically coordinate the distribution of the plurality of discrete processing tasks to the available worker machines.

26. The system of claim 25, wherein recording the processed data to the at least one data storage device results in an original file, and wherein the electronic discovery distribution engine is further configured to:
detect a duplicate file of the original file in the electronic discovery data based at least partially on hash values of the duplicate file and the original file;
generate a new record for the duplicate file;
generate a clone of the original file; and
store the clone in the new record.

27. The system of claim 26, wherein the electronic discovery distribution engine is further configured to cause the at least one processor to generate a hash value for each file processed of the plurality of electronic files, wherein the duplicate file is detected by comparing a hash value for the duplicate file with at least one hash value for at least one previously processed file including the original file, such that the hash value for the duplicate file matches at least one hash value for the at least one original file.

28. The system of claim 25, wherein recording the processed data to the at least one data storage device results in at least one original file, and wherein the electronic discovery distribution engine is further configured to:
detect a duplicate file of the original file in the electronic discovery data;
generate a new record for the duplicate file; and
store a pointer to the original file in the new record.

29. The system of claim 28, wherein the electronic discovery distribution engine is further configured to cause the at least one processor to process the duplicate file, resulting in extracted data including metadata, and wherein storing the pointer in the new record comprises embedding the pointer in the metadata.

30. The system of claim 24, wherein the electronic discovery distribution engine is further configured to:
determine a bias for each session of the plurality of discovery sessions based at least partially on at least one deadline; and determine processing resource allocations for the plurality of discovery processing sessions, wherein the coordinated distribution is determined based at least partially on the determined processing resource allocations such that a session with a higher bias will be assigned more worker machines than a session with a lower bias having the same priority as the session with the higher bias.

31. The system of claim 24, wherein the electronic discovery distribution engine is further configured to:
add at least one worker machine to the plurality of available worker machines;
determine a new coordinated distribution of at least a portion of the plurality of discrete tasks to the plurality of available worker machines; and
assign at least a portion of the plurality of discrete tasks to the plurality of available worker machines based on the new coordinated distribution.

32. The system of claim 24, wherein the electronic discovery distribution engine is further configured to receive, from at least one user, a priority and a bias for each discovery processing sessions of the plurality of discovery processing sessions, wherein determining the coordinated distribution of the plurality of discrete tasks to the plurality of available worker machines comprises:

(a) identifying at least one discovery processing session of the plurality of discovery processing sessions having a highest priority;
(b) identifying a subset of available worker machines of the plurality of available worker machines;
(c) allocating the subset of available worker machines to the at least one discovery processing session having the highest priority based on the bias for each discovery processing session of the at least one discovery processing session; and
(d) repeating steps (a)-(c) for remaining discovery processing sessions of the plurality of discovery processing sessions.

* * * * *